Sept. 28, 1965 A. O. LANGSETH ETAL 3,208,871
METHOD OF MAKING STAIN-RESISTANT ROOFING
GRANULES, AND PRODUCT THEREOF
Filed July 30, 1962

INVENTORS
AXEL O. LANGSETH
JAMES R. LODGE
BY
Carpenter, Abbott, Coulter & Kinney
ATTORNEYS 3,208,871
METHOD OF MAKING STAIN-RESISTANT ROOF-
ING GRANULES, AND PRODUCT THEREOF
Axel O. Langseth and James R. Lodge, St. Paul, Minn.,
assignors to Minnesota Mining and Manufacturing
Company, St. Paul, Minn., a corporation of Delaware
Filed July 30, 1962, Ser. No. 213,126
6 Claims. (Cl. 117—27)

This application is a continuation-in-part of our copending application Serial No. 816,077, filed May 27, 1959, now abandoned.

The present invention relates to artificially color-coated mineral roofing granules exhibiting a very high resistance to staining by oils and other materials from asphalt roofing material in which the granules are embedded.

The tendency of the granular surfacing of asphalt based roofing to absorb and become stained by oils and other migratory materials in the asphalt, especially during storage of the roofing prior to use, is well known. The problem is most acute in the instance of artificially color-coated granules, the color-coatings of which have been insolubilized by firing at high temperatures. Apparently such coatings tend to become somewhat porous upon firing. Over the years, much attention of the industry has been directed toward minimizing the staining problems in color-coated granules. Significant progress has been made due to various novel developments in technology. In recent years, however, the requirements in the building industry for stain-resistant color-coated granule surfaced roofing have become even more stringent than they previously had been. At the same time the public has come more and more to desire very light colored roofing, where the color granule surfacing of the roofing is a high intensity white or other light color. Thereby the problems of color-coated granule manufacturers in providing high stain-resistant granules are compounded, since staining is much more observable and objectionable in white or light colored granules than in darker more subdued granules employed widely in the past.

The attitude of the building industry in demanding granules of increased stain-resistance can be illustrated with reference to a standard test, employed under accelerated aging and/or weathering conditions, designed to indicate comparative stain resistance in granule surfaced roofing. Such a test involves the placing of a sample or shingle of asphalt based roofing surfaced with the granules in question in an oven heated to 176° F. It is known to accelerate any staining of the granules by the oils or other staining components in the asphalt roofing. Whereas until very recent years a shingle was considered fully satisfactory from the standpoint of stain-resistance if the granule surfacing would appear unstained after being subjected to this test for 24 hours, present day roofing is not considered to be adequately stain-resistant unless it can withstand such test for upwards of four days without substantial discoloration.

The present invention is directed to the provision of methods for making artificially color-coated granules which, when embedded in the surface of asphalt roofing, adequately withstand the "four day" staining test, to the novel stain-resistant granules so produced, and to roofing surfaced therewith. We have found that if the color-coating of the granules is applied in two or more coats, wherein the first coat is purposely rendered rather porous and absorptive relative to the per se nature of the second coat, resistance to staining in the resulting granules is markedly increased over that of granules where the compositions of the two coatings are the same. Granules thereby can be prepared without necessity of using special stain-resistant additives, which satisfy even the most stringent present day requirements.

In general, the process and product of the present invention are illustrated by the drawings wherein.

Figure 1:
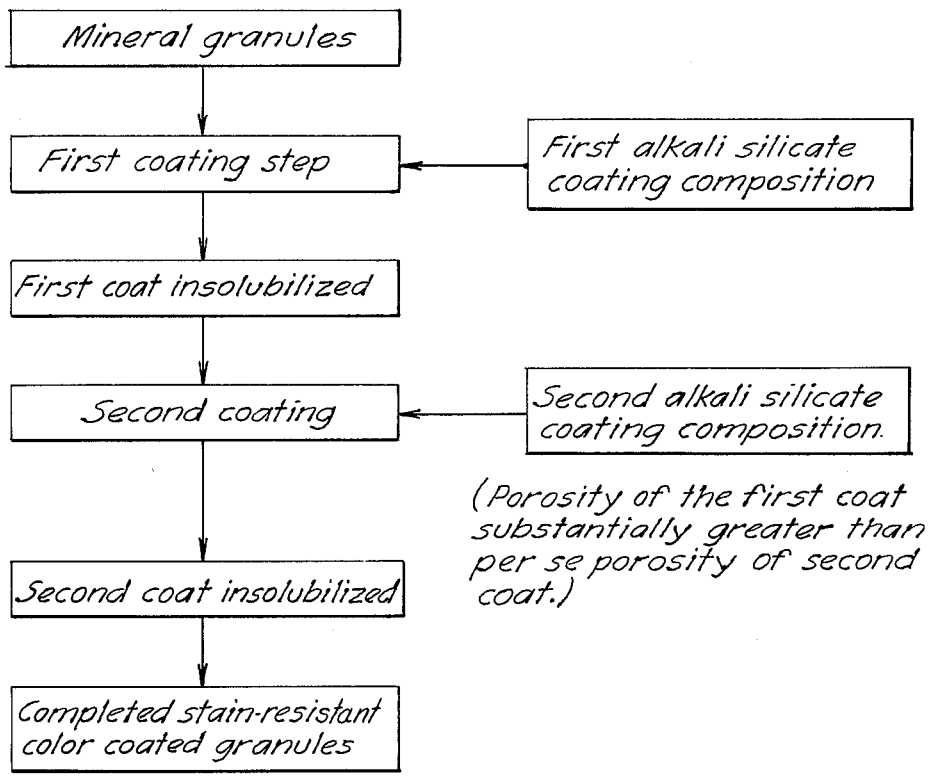
FIGURE 1 is a flow diagram of a process embodying my invention.
Figure 2:
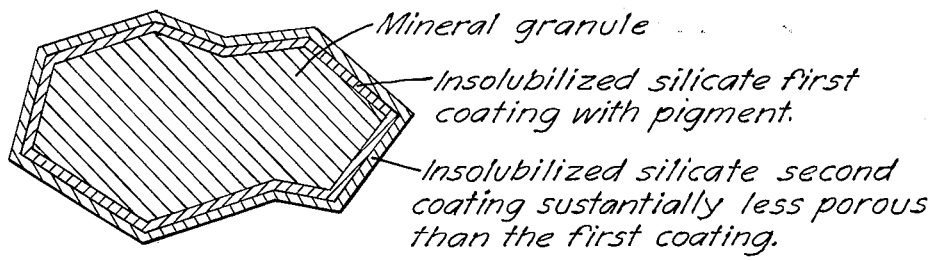
FIGURE 2 is an enlarged cross sectional view, schematic in character, of a roofing granule of the invention.
Figure 3:
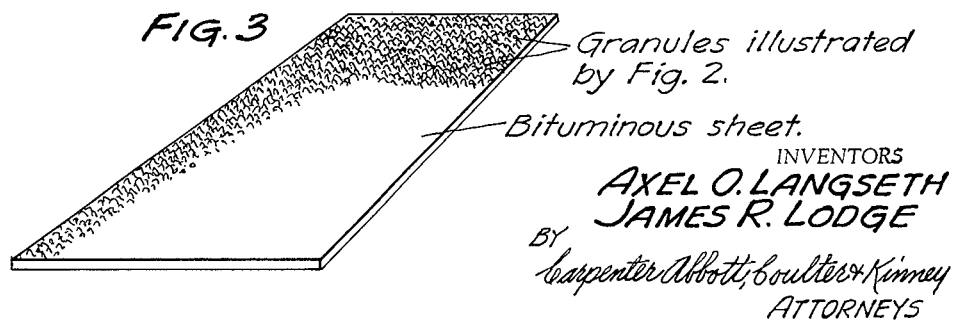
FIGURE 3 is a sheet product having a surfacing of a plurality of granules exemplified in FIG. 2.

The significance of our novel discoveries is brought into clear relief in light of the generally accepted proposition that a porous coating on a granule tends to show little resistance to staining. It would thus be entirely unexpected that a high stain resistance would result in a granule where a porous first coat purposely is provided, whatever the nature of the second coating composition.

Preferably the relative porosities of the coatings are controlled by appropriately varying or controlling the constituents, particularly the reactive constituents forming the insolubilized coatings, and the ratios thereof one to another, in the respective coating compositions. By way of specific illustration, reference is made to the so-called high temperature granules disclosed in Jewett Patent No. 2,379,358, granted June 26, 1945, the insoluble color-coatings of which are formed by a pigmented kaolin clay alkali silicate reaction product formed during firing of the coated granules at a high temperature. We have found that if the amount of kaolin relative to the amount of silicate employed in the precoat is kept rather high, for example in an amount equal to the weight of alkali silicate solids, and preferably in an amount about twice the weight of the alkali silicate solids, and the relative amount of clay is much lower in the second coat (consistent with proper reaction between clay and silicate), e.g., from about ⅓ to ⅔ the weight of the alkali silicate solids, the granules being fired to a temperature of at least 600° F. after each coating, the stain resistance in the resulting granules is remarkably superior to that which is exhibited where the same ratio of clay to silicate is utilized in both coats.

Our invention will now be specifically illustrated with the aid of the following non-limiting specific examples:

*Example I*

A precoat composition is prepared in accordance with the following formulation:

| | Pounds |
|---|---|
| $TiO_2$ | 15 |
| Kaolin | 50 |
| "K" brand aqueous sodium silicate (42.9% solids) ($Na_2O:SiO_2$ ratio equals 1:2.9) | 62 |
| Water | 24 |

The ingredients of the coating composition are first mixed together, following which the composition is applied to 2,000 pounds of #11 grade (—10+35 mesh) granules, for example greystone granules, in a tumbling barrel-type mixer. The coating is then pre-dried, by passing air through the mixer, until the coated granules are free-flowing, all in accordance with conventional practice, after which the granules are transferred to a rotary kiln and fired at 950° F., dwell time in the kiln being about 20 minutes. The granules are then cooled in a rotary cooler.

In the meantime a second coating composition is prepared by mixing ingredients in accordance with the following formulation:

| | Pounds |
|---|---|
| $TiO_2$ | 15 |
| Kaolin | 10 |
| "K" brand aqueous sodium silicate (42.9% solids) | 60 |
| Water | 20 |

The second coating composition is applied to the cooled precoated granules by similar procedures as followed in the application of the first coating, following which the granules are again fired in a rotary kiln at 950° F. to insolubilize the coating. The granules are again cooled in a rotary cooler, where suitable slate oil or adhesive treatments are applied, as desired. A striking high intensity while granule results.

When the granules of the present examples are embedded in asphalt roofing, and a sample of the resulting granule surfaced roofing is placed in an oven heated to a temperature of 176° F. for four days, the granule surfacing shows very little if any discoloration.

On the other hand, where the coating compositions are the same in each of the two coating steps, as where both are like the precoat composition or both are like the second composition of the present example, substantial staining occurs in the granule surfacing of a roofing sample subjected to the "four-day" staining test. The same result occurs where the coating compositions are formulated by mixing as one batch the total materials in both compositions specified in the present example, and then applying one-half the resulting composition to the raw granules as a precoat and the remainder as the second coat. Nor insofar as we are aware does any singly coated granule containing a fully insolubilized coating of the same constituents as those employed in the present example, irrespective of amounts or ratios, satisfy the staining test.

When samples of the precoated granules (to which no second coating is applied), and of the completed granules respectively are subjected to a conventional oil absorption test, the absorptivity of the former substantially exceeds that of the latter. Thus, the porosity of the precoated granules is substantially greater than that of the resulting porosity of the completed granules. Actually, the precoated granules of the present example are found to be highly susceptible to staining when applied to surfacing of asphalt roofing.

When base granules are coated directly with the second coat (without a precoat), absorptivity is lower than that of the precoated granules (indicating greater porosity in the precoated granules); but the absorptivity of both is substantially greater than that of the granules of the present example.

In the present example about 1.90 parts of kaolin are present in the precoat composition per part of alkali silicate solids, while 0.4 part of kaolin per part of alkali silicate solids are present in the second coating composition. Ratios of about 2 parts of clay per part of silicate in the precoat and of about 0.4–0.5 part clay per part of silicate in the second coat appear to exemplify the optimum ratios of ingredients of the respective coatings where the reactant materials in the coatings are clay and alkali silicate. The particular ratio of $Na_2O$ to $SiO_2$ in the alkali silicate appears to be relatively unimportant, so long as a silicate used is capable of reacting to an insolubilized form upon firing. Of course, where other materials are included in one or other of the coatings which substantially effect coating porosities, coating compositions will have to be appropriately formulated with this in mind. In general, however, where the reactive constituents in the several coating compositions are the same, any significantly greater clay-to-silicate ratio in the precoat composition, as compared with the final coating composition, appears to yield a granule having significantly improved stain resistance.

It should be noted that other requisites of an acceptable granule color-coating, e.g., such as completeness of reaction and insolubility (often measured by alkalinity) and color, must be considered in selecting coating formulations, as these may have a bearing on specific proportions which can be employed or tolerated. For example, the total amount of clay or equivalent employed, in proportion to the total amount of alkali silicate employed in the total of the coating compositions, should be sufficient so the latter is thoroughly reacted, and enough alkali silicate should be used properly to bond the pigments and/or other non-reactive materials to the surfaces of the granules. Differences in porosities of the color-coatings can also be achieved in other fashions than by controlling the amounts or ratios of reactive constituents in the respective coatings. Indications are this may be done, for example, by employing porous extenders and very high pigment loadings in the precoat compositions. The desired differences in porosities can also be achieved by firing the second coating at a substantially lower temperature than that of the first coating, the two coating compositions being similar. It has also been found that if the particular type of clay utilized in the second coat is a type which is more reactive than that employed in the first coat, the porosity of the second coating is decreased, conditions otherwise being substantially the same. If, for example, "Dover" clay, available from the R. E. Carroll Co., Trenton, New Jersey, is utilized in the second coating, and conventional kaolin in the precoat, conditions otherwise being similar, the advantages of the present invention obtain. Combinations of the various means disclosed herein for achieving the differences in porosity may be employed. Thus, in the following example the clay to silicate ratio is substantially reduced, a more reactive clay is employed in the second coat and the granules are fired at a lower temperature in the step of insolubilizing the second coat.

*Example II*

A precoat composition having the same formulation as Example I is mixed and applied to granules and the granules are fired to 950° F. as in Example I.

A second coating composition is prepared by mixing ingredients in accordance with the following formulation:

| | Pounds |
|---|---|
| $TiO_2$ | 15 |
| Kaolin (Dover clay) | 10 |
| Sodium tetraborate decahydrate (borax) | 4 |
| "K" brand aqueous sodium silicate (42.9% solids) | 45 |
| Water | 25 |

The second coating composition is applied to the cooled precoated granules as in Example I, following which the granules are fired in a rotary kiln at 700° F. to insolubilize the coating. Granules are again cooled and suitable oil or treatments are applied as desired.

The stain resistance of the white granules of Example II is improved over that of Example I, in that when the granules are embedded in asphalt roofing and test samples subjected to the "four day" staining test, even less discoloration occurs than that occurring in the instance of test samples utilizing the granules of Example I.

It will be noted that the second coating composition in Example II contains borax. It has been found that with the use of an oxygen containing boron salt such as borax, other sodium borates and metaborates, or other metal borates such as zinc borates, lithium borates, lead borates, or other borates which are compatible with (i.e. do not gel) the silicate in solution, the clay silicate coatings can be fired at relatively lower temperatures (e.g. 650° F.–750° F.) to yield insoluble weather-resistant coatings of low alkalinity. The specific discovery relating to the utilization of oxygen containing boron materials in the provision of pigmented silicate coating compositions and roofing granules which are fired at relatively low temperatures, is being made the subject of a separate application.

Where pigments are to be employed which are heat sensitive and tend to burn out at high temperatures, such as phthalocyanine green or yellow iron hydrate pigments, firing temperatures can be reduced below those employed in Example II by omitting the clay from the coating composition and neutralizing the fired silicate coated granules with an acid or acid salt "pickling" treatment—all with due regard to employing a second coat which is per se of lower porosity than the precoat.

The following example illustrates the use of the principles of our invention in the preparation of high temperature colored granules:

*Example III*

Two coating compositions were prepared having the following respective formulations:

| Precoat composition: | Pounds |
|---|---|
| TiO₂ | 24 |
| Kaolin | 50 |
| Red iron oxide | 2 |
| "K" brand aqueous sodium silicate (42.9% solids) | 60 |
| Water | 24 |
| Second coating composition: | |
| Red iron oxide | 10 |
| Kaolin | 10 |
| "K" brand aqueous sodium silicate (42.9% solids) | 60 |
| Water | 20 |

The precoating composition was applied to the granules, following which the coated granules were fired in a rotary kiln at 950° F. as described in the preceding example. The precoated granules were very light red or pink in color. Next the second coating composition was similarly applied, after which the granules were fired, cooled and treated with slate oil or other adhesion treatments as desired.

A vivid red colored granule resulted. It is noted that the striking color of the resulting granules is due at least in part to the light colored precoating.

As in the previous examples, the porosity of the precoating was substantially greater than that of the second coat in the completed granules. When the granules were embedded in asphalt roofing, the resulting roofing readily passed the "four day" stain resistance test. On the other hand, where the clay to silicate ratio in the two compositions was the same in the two coating compositions (the ingredients of the respective compositions otherwise being the same), the granular surfacing of roofing made utilizing the resulting granules stained substantially when subjected to the "four day" stain resistance test.

While in the specific examples hereof each of the precoated and coating compositions contained pigment, interesting and desirable effects can be attained by omitting the pigment from one of the coating compositions. For instance, in the red granules of Example III, a somewhat lighter red granule can be obtained by omitting the red iron oxide pigment from the precoat composition; and an interesting pastel effect is obtained by including the pigment in the precoat composition but omitting it from the second coating composition. Similiarly, composite color effects can be obtained by employing differently colored pigments in the two coating compositions.

What we claim is as follows:

1. A process for preparing highly stain-resistant artificially color-coated granules, said process comprising coating raw mineral granules with a first aqueous pigmented alkali silicate coating composition, insolubilizing said first coating, coating the resulting precoated granules with a second differently constituted pigmented alkali silicate coating composition, and insolubilizing said second coating, the compositions of the respective coatings yielding a porosity in said precoating which is substantially greater than the porosity of said second coating where the latter is coated alone on raw mineral granules and insolubilized.

2. A process for preparing highly stain-resistant artificially color-coated granules, said process comprising coating raw mineral granules with an aqueous precoat composition including clay, pigment and soluble aqueous alkali silicate, firing the granules at a temperature of at least about 600° F. to insolubilize the precoating; coating the resulting precoated granules with a second aqueous coating composition including clay, pigment and soluble alkali silicate, and firing the coated granules at a temperature at least about 600° F. to insolubilize the coating, the ratio of clay to silicate in said precoating composition being substantially greater than the ratio of clay to silicate in the said second coating composition.

3. A process for preparing highly stain-resistant artificially color-coated granules, said process comprising coating raw mineral granules with an aqueous precoat composition including clay, pigment and soluble aqueous alkali silicate, at least one part clay per part of alkali silicate solids being present in said precoat composition by weight; firing the granules at a temperature of at least about 600° F. to insolubilize the precoating; coating the resulting precoated granules with a second aqueous coating composition including clay, pigment and soluble alkali silicate, the clay in said second composition being present in an amount from about one-third to about two-thirds by weight of the alkali silicate solids in said second composition, and firing the coated granules at a temperature at least about 600° F. to insolubilize the coating.

4. A process for preparing highly stain-resistant artificially color-coated granules, said process comprising coating raw mineral granules with a first aqueous alkali silicate coating composition, insolubilizing said first coating, coating the resulting precoated granules with a second alkali silicate coating composition, and insolubilizing said second coating, at least one of said coating compositions being pigmented, the compositions of the respective coatings yielding a porosity in said precoating which is substantially greater than the porosity of said second coating where the latter is coated alone on raw mineral granules and insolubilized.

5. Stain resistant roofing granules comprising mineral granules having a firmly adherent first insolubilized silicate coating, and thereover a firmly adherent second insolubilized silicate coating, at least one of said coatings being pigmented, and the porosity of said first coating being substantially greater than the per se porosity of said second coating.

6. A composite sheet body for roofing and siding comprising a bituminous sheet product having a firmly adherent surfacing consisting essentially of the stain-resistant granules of claim 5.

References Cited by the Examiner

UNITED STATES PATENTS

| 1,898,345 | 2/33 | Denning. |
| 2,001,448 | 5/35 | Beasley. |
| 2,081,609 | 5/37 | Teetor | 117—27 |
| 2,163,678 | 6/39 | Gundlach. |
| 2,973,283 | 2/61 | Hill. |
| 2,981,636 | 4/61 | Lodge et al. | 117—100 XR |

WILLIAM D. MARTIN, *Primary Examiner.*